United States Patent [19]

Dehoff

[11] 4,420,281
[45] Dec. 13, 1983

[54] FAIL-SAFE MECHANISM
[75] Inventor: Robert E. Dehoff, Mt. Joy, Pa.
[73] Assignee: AMP, Incorporated, Harrisburg, Pa.
[21] Appl. No.: 308,766
[22] Filed: Oct. 5, 1981
[51] Int. Cl.³ .............................................. F16B 35/02
[52] U.S. Cl. .................................. 411/392; 81/471;
411/395; 411/418
[58] Field of Search .................... 81/467, 471, 477;
464/42; 411/8, 9, 392, 395, 417, 418; 403/2,
343; 408/222

[56] References Cited

U.S. PATENT DOCUMENTS 1,163,897  12/1915  Dodds .................................. 411/418
2,292,195   8/1942  Brown .............................. 411/418 X

FOREIGN PATENT DOCUMENTS 821495  12/1937  France ................................ 411/418

Primary Examiner—Frederick R. Schmidt
Assistant Examiner—Debra S. Meislin
Attorney, Agent, or Firm—Allan B. Osborne

[57] ABSTRACT

The present invention relates to a threaded member incorporating structural features which prevents more than a required amount of torque or rotational force to be applied thereto. More particularly, the shaft of the threaded member is hollow and slotted so that it buckles or collapses inwardly when the member bottoms out.

1 Claim, 3 Drawing Figures

U.S. Patent  Dec. 13, 1983  4,420,281

FAIL-SAFE MECHANISM

The present invention relates to a threaded member incorporating means which prevents more than a required amount of torque or rotational force to be applied thereto. More particularly, the shaft of the threaded member is hollow and slotted so that it buckles or collapses inwardly when the member bottoms out.

It is known to construct a threaded member such as a bolt with two wrench-receiving heads, arranged in tandem and with a thin shank connecting the two. Excessive torgue on the outermost head breaks the shank, leaving the lower head intact so that the bolt can be withdrawn and used again. The torque limiting means is destroyed after an initial use, however.

The present invention is intended to provide non-destructive means on a threaded member which allows the threaded portions to disengage from the cooperating threads in a bore which has received the threaded member before damage can be done either to the member or the receiving bore from excessive torque.

The threaded member is, according to the present invention therefore, characterized in that the threaded shank portion is hollow and slotted longitudinally to provide a plurality of resiliently deformable segments capable of buckling inwardly and becoming disengaged from the threads of the threaded bore when receiving excessive torque is applied.

Figure 1:
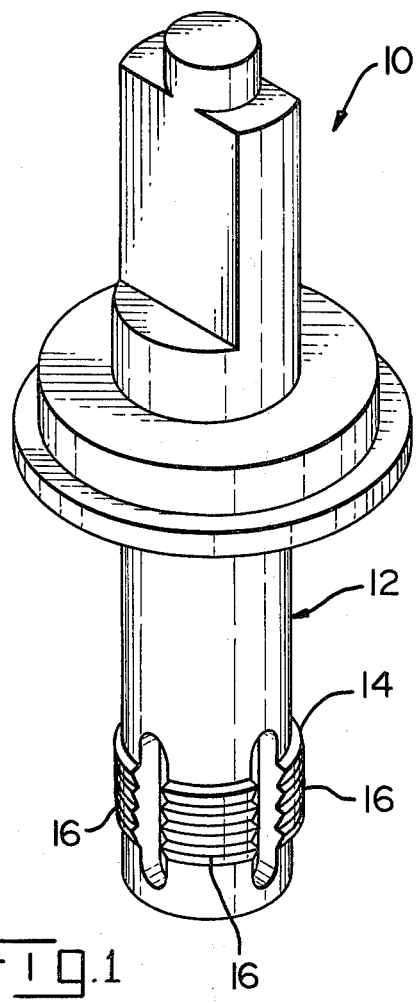
Figure 2:
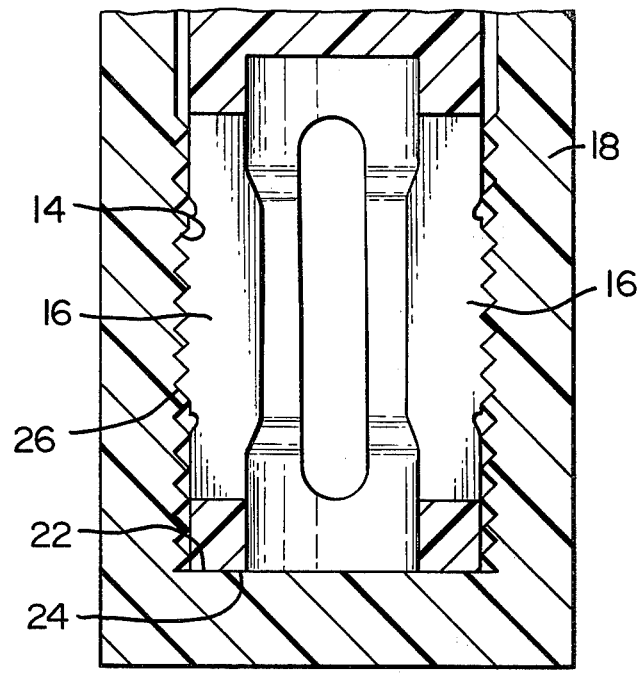
Figure 3:
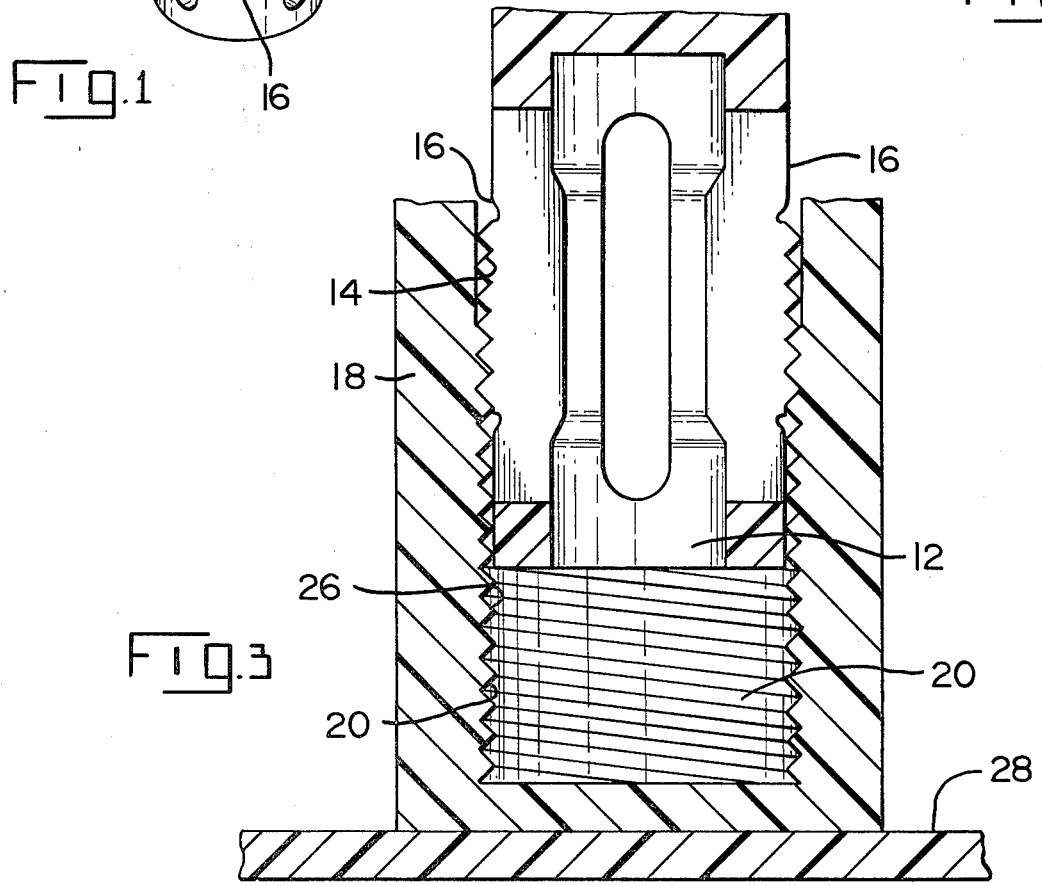

For a better understanding of the invention, reference will now be made by way of example to the accompanying drawings, in which:

FIG. 1 is a perspective view of a threaded member incorporating the present invention; and FIGS. 2 and 3 are cross-sectional views illustrating how the present invention works in two situations.

With reference to FIG. 1, valve stem 10 shown therein is used in a tee valve such as the AMP-FIT tee valve sold by AMP Incorporated of Harrisburg, Pa. The valve may be used to connect and control the flow of gas from a main line to a feeder line. However, the present invention is not to be construed as limited to that particular usage.

The present invention is incorporated into the shank 12 of stem 10. More particularly, the portion of the shank having threads 14 on its circumference is hollowed out and slotted to provide a plurality of resilient segments 16. As shown in the drawings, the segments extend axially for a predetermined distance on either side of threads 14. Accordingly, it is necessary for the shank to have non-threaded portions on either side of the threaded portion. The length of the segments and the number depends on the resiliency of the material used in making shank 12 and the amount of rotational force which actuates the fail-safe mechanism.

FIG. 2 is a view illustrating the workings of the fail-safe mechanism of the present invention. In the drawings, valve stem 10 is being used to move a cylindrical valve gate 18 into and out of the opening between a main line and feeder line (not shown). Shank 12 is threadably received in bore 20 of the gate.

In FIG. 2, gate 18 has been moved up by rotating stem 12. The free end 22 of shank 12 has met floor 24 of bore 20. In the absence of the fail-safe mechanism, additional rotational force would result in breakage of stem 10, particularly shank 12. However, because of the fail-safe mechanism, additional rotational force causes segments 16 to buckle or collapse inwardly so that threads 14 and threads 26 in bore 20 disengage and gate 18 is pushed down. The downward travel is just enough so that as the segments recover, threads 14 engage threads 26 at one thread spiral up. As the threads reengage, they make a noise; i.e., a "pop", which is an audible signal to stop turning the valve stem. Because the gate moves down with each turn, additional turning repeats the collapsing, recovery, and popping noise ad infinitum without damage to the stem or gate.

The fail-safe mechanism works in the same manner in the situation shown in FIG. 3. Gate 18 has been moved down to bottom out on a shoulder 28. Further, rotational force causes the above-mentioned collapsing, recovery and popping, all without damage to stem 10 or gate 18.

The material used in making valve stem 10 for use in the noted valve is glass filled nylon. Other materials including metals can be used with equally good results.

An alternative embodiment is one wherein shaft 12 terminates immediately below the threaded portion.

I claim:

1. An improvement to a threaded member capable of preventing damage to the threaded member by excessive rotational forces being applied thereto when the member is being advanced in a complementary threaded female member, said member being of the type having a shank with a free end at one end and means for applying rotational force at another end, the improvement characterized in that the threads extend over a limited portion of the shank, terminating above the free end and below the other end, and with the shank being hollow and axially slotted throughout the length of and for a distance on each side of the threaded portion to define a plurality of resilient, axially extending threaded segments which include non-threaded portions extending above and below the threaded portion, said threaded segments and axial slots terminating above the free end, so that when the shank, under continual rotational force, becomes immobile, said segments are capable of recoverably collapsing inwardly whereupon the threads thereon become momentarily disengaged from the threads in the complementary member and the position of the shank relative to the complementary member shifts to permit the shank to be turned again whereupon the segments again recoverably collapse.

* * * * *